US008126129B1

(12) United States Patent
McGuire (10) Patent No.: US 8,126,129 B1
(45) Date of Patent: Feb. 28, 2012

(54) ADAPTIVE AUDIO CONFERENCING BASED ON PARTICIPANT LOCATION

(75) Inventor: Russell Spaid McGuire, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1404 days.

(21) Appl. No.: 11/701,853

(22) Filed: Feb. 1, 2007

(51) Int. Cl.
*H04M 3/42* (2006.01)

(52) U.S. Cl. .................... 379/202.01; 455/416
(58) Field of Classification Search .......... 379/202.01, 379/202.02, 203.01, 204.01; 455/416
See application file for complete search history.

(56) References Cited

U.S. PATENT DOCUMENTS

| | | | | |
|---|---|---|---|---|
| 6,408,327 B1 | 6/2002 | McClennon et al. | ......... | 709/204 |
| 6,683,858 B1 | 1/2004 | Chu et al. | ...................... | 370/263 |
| 6,721,411 B2 | 4/2004 | O'Malley et al. | ........ | 379/202.01 |
| 6,879,565 B2 | 4/2005 | Baxley et al. | ................. | 370/261 |
| 7,006,616 B1 | 2/2006 | Christofferson et al. | .. | 379/202.1 |
| 7,054,424 B2 | 5/2006 | O'Malley et al. | ........ | 379/201.01 |
| 7,054,820 B2 | 5/2006 | Potekhin et al. | .............. | 704/275 |
| 7,539,486 B2 * | 5/2009 | Seligmann | .................... | 455/416 |
| 2007/0291918 A1 * | 12/2007 | Diethorn | .................. | 379/202.01 |

* cited by examiner

*Primary Examiner* — Curtis Kuntz
*Assistant Examiner* — Maria El-Zoobi (57) ABSTRACT

An audio conferencing method is disclosed in which the geographic location of the participants is used as a basis to adaptively mix audio signals. In particular, if two or more participants are at the same location, the audio signals are mixed such that the participants at the same location do not receive audio signals originating from their telephones. Rather, they only receive audio signals from other participants who are not at their location. An override feature is also described by which a participant can opt-out and receive audio signals from participants at its location. The determination of location continues periodically during the conference. The methods are particularly suitable where multiple participants are using wireless telephones and hence are mobile. The location information can be obtained from a position determination entity of a wireless service provider network.

16 Claims, 5 Drawing Sheets

| CONF. NO. /102 | CONFERENCE PARTICIPANTS /104 | LOCATION /100 /106 | OVERRIDE /107 | LOCATION GROUP /108 | MIX /110 |
|---|---|---|---|---|---|
| 3571366 | 1. JOE (360-378-4122) | — | | 4,5,6 | 2+3+4+5+6+7 |
| | 2. MARY (510-213-5177) | 47°.14'.51" N 123°.22'.45" W | | | 1+3+4+5+6+7 |
| | 3. FRANK (510-717-2104) | — | | | 1+2+4+5+6+7 |
| | 4. PETER (206-431-8920) | 44°.21'.33" N 102°.57'.63" W | NO | | 1+2+3+7 |
| | 5. BOB (619-534-1002) | 44°.21'.33" N 102°.57'.63" W | NO | | 1+2+3+7 |
| | 6. AMANDA (513-616-4252) | 44°.21'.33" N 102°.57'.63" W | NO | | 1+2+3+7 |
| | 7. STEVE (521-438-7108) | — | | | 1+2+3+4+5+6 |
| | ... | ... | | | |

FIG. 2A

| CONF. NO. [102] | CONFERENCE PARTICIPANTS [104] | LOCATION [106] | OVERRIDE [107] | LOCATION GROUP [108] | MIX [110] |
|---|---|---|---|---|---|
| 3571366 | 1. JOE (360-378-4122) | — | | 4,5,6 | 2+3+4+5+6+7 |
| | 2. MARY (510-213-5177) | 47°.14'.51" N 123°.22'.45" W | | | 1+3+4+5+6+7 |
| | 3. FRANK (510-717-2104) | — | | | 1+2+4+5+6+7 |
| | 4. PETER (206-431-8920) | 44°.21'.33" N 102°.57'.63" W | NO | | 1+2+3+7 |
| | 5. BOB (619-534-1002) | 44°.21'.33" N 102°.57'.63" W | YES | | 1+2+3+4+6+7 |
| | 6. AMANDA (513-616-4252) | 44°.21'.33" N 102°.57'.63" W | NO | | 1+2+3+7 |
| | 7. STEVE (521-438-7108) | — | | | 1+2+3+4+5+6 |
| | ... | ... | | | |

ADAPTIVE AUDIO CONFERENCING BASED ON PARTICIPANT LOCATION

BACKGROUND

A. Field

This invention relates to the art of audio (telephone) conferencing methods and systems, and more particularly to a method for adaptive mixing of audio signals during an audio conference which takes into account the geographic location of one or more of the participants.

B. Related art

A variety of network-based audio conferencing systems are known in the art and available in the marketplace. Such systems allow a plurality of distributed conference participants to hear each other during the course of a telephone conference. Such systems use a network platform or conference server that receives audio signals from the participants, mixes them and sends a mixed audio signal to the participants.

The following patent documents disclose network-based audio conference systems and components thereof: Christofferson, et al., U.S. Pat. No. 7,006,616; O'Malley et al., U.S. Pat. No. 7,054,424; McClennon et al., U.S. Pat. No. 6,408,327; O'Malley et al., U.S. Pat. No. 6,721,411; Baxley et al., U.S. Pat. No. 6,879,565; Potekhin et al., U.S. Pat. No. 7,054,820 and Chu et al., U.S. Pat. No. 6,683,858. The content of these references is incorporated by reference herein. These and other systems include a mixing unit, sometimes referred to in the art as a multi-point control unit or "MCU", which mixes selected input audio signals to form an output audio stream for distribution to the telephones of the conference participants.

It is known in the art to provide mute and volume control features on telephone units to control transmission and reception of the audio streams to and from a telephone. The mute feature is typically implemented by pushing a mute button on a phone or pressing a particular digit sequence, such as the # or * key. When this feature is activated, the phone does not transmit audio signals to the MCU. The volume control features are also typically implemented locally on the phone by activating a dial or switch to increase or decrease the volume of the received (mixed) audio stream.

Sometimes audio conferences occur in which two or more conference participants are at the same location, e.g., in the same office, but are speaking on different phones. This situation can arise in a variety of contexts, including a situation where the participants are using cellular telephones and the conference is impromptu, i.e., the parties are not in a location where there is a land-line phone with speaker-phone capability. In this situation, the participants at the same location experience the effect of hearing the other co-located participants both directly (by virtue of being next to them) and over the phone. When this occurs, the co-located participants experience undesirable delay or echo between the speech produced locally and the speech emanating from the speakers in their phones. Furthermore, if the co-located participants were to attempt to solve the echo problem by activating a mute feature on their phone, then the non-co-located participants would not be able to hear what they were saying. If they turned down the volume, on their handset, then they would not be able to hear the non-co-located participants. Accordingly, there is no ready solution to this problem.

The methods of this disclosure correct this situation in a novel fashion by adapting the mixing of audio signals in the conference server in a manner which takes into account location of the participants.

SUMMARY

The following embodiments and aspects thereof are described and illustrated in conjunction with systems, tools and methods which are meant to be exemplary and illustrative, not limiting in scope. In various embodiments one or more of the above-described problems have been reduced or eliminated, while other embodiments are directed to other improvements.

The methods of this disclosure provide a significant usability advantage over existing art in the situation where two or more conference participants are at the same location and speaking on different telephones. In particular, the mixing of audio signals from the participants at the audio conference server or MCU is automatically and adaptively adjusted based on the location of participants to avoid the effect of a participant hearing another participant both in person and over the phone. In accordance with the teachings described herein, the situation is remedied automatically in the MCU. The methods do not requiring manual user intervention, such as activating volume controls, or activating a muting function, e.g., in response to a request from another participant.

In one embodiment of the invention, a method of mixing audio signals from multiple remotely located conference participants is provided. The method includes a step of obtaining geographic location information for at least some of the conference participants. In the case of wireless telephones, such location information can be obtained from an existing network entity in a wireless service provider network ("position determination entity" or PDE) which is tasked with obtaining device location information. Such information can be obtained from Global Positioning System (GPS) chipsets in the wireless phone, or using position triangulation methods such as used in E-911 services. The obtaining of location information can be performed specifically only for participants using wireless phones, or for other participants or types of phones as well. Such location information can be obtained when the participant joins the conference, for example by exchange of location request and response messages between the MCU and the phone or by the MCU sending a query to a wireless service provider PDE node.

In the event that two or more of the conference participants are located in the same geographic location (e.g., by having the same latitude and longitude coordinates), the method includes a step of mixing audio signals for distribution to the conference participants such that an audio signal is distributed to the conference participants located in the same geographic location which substantially does not include audio signals received from any of the conference participants at the same geographic location. The audio signal sent to the co-located participants can either omit entirely audio signals received from the co-located participants or else substantially mute them (at the network conference mixer) relative to non co-located participants. In other words, the MCU mixes audio signals in a manner in which the participants at the same location basically only hear the audio signals from participants at different locations (and participants whose location is unknown). The method assumes that the co-located participants directly hear the speech of other co-located participants because they are proximate to each other, and should not and need not hear the other co-located participants over their telephone. Consequently, delay or echo effects that would otherwise be present due to hearing co-located participants both directly and through the earpiece of the telephone are avoided. (The mixing of signals for audio conference participants who do not have any other participants at their location is done in the usual or normal fashion—the signals are mixed such that they receive audio signals from all the other participants.)

In one variation, the method further comprises the step of prompting conference participants located in the same geographic location to confirm that such participants can hear speech from the other conference participants at the same geographic location. If they respond in the negative, the MCU mixes the audio as if such person was not in the same geographic location.

In another variation, the participants can override the location-based mixing during the conference. For example, a participant located at the same geographic location as another participant can issue an override signal (such as by pressing #8) which is sent to the MCU. The MCU responsively adjusts the mixing such that the participant sending the override signal receives audio signals from the other participants at the same geographic location, in addition to audio signals from participants that are not at that location. In other words, the MCU essentially treats the participant who sends the override signal as though it is at a different location and not a member of a group of participants at the same location.

The step of determining the location of the participants can be continued in real time during the audio conference to thereby detect when one of the participants moves and is not co-located with other participants. When such movement is detected, the conference mixer adapts the conference mixing accordingly. For example, the party that moved is treated as not being co-located with any other participants. As another example, if participant "A" moves to a new location which is the same as that of participant "B", the mixer identifies a new group of co-located participants (A and B) and adapts the conference mixing accordingly. That is, the conference mixer mixes audio from all other participants and sends that mixed audio signal to A and B, but does not include in the mixed audio signal audio received from either A or B.

In another aspect, a method is disclosed for providing conference services for multiple remotely located conference participants. The method comprises the steps of: (a) obtaining geographic location information of at least some of the conference participants; (b) determining whether more than one conference participants are located at substantially the same geographic location; and (c) in the event that more than one conference participant(s) are located in the same geographic location, audio signals from the conference participants are mixed in accordance with the following steps:

(1) a group of conference participants which are located at the same geographic location is formed or otherwise identified;

(2) audio signals from the conference participants are mixed to form an composite audio signal for distribution to the members of the group such that the composite audio signal contains audio signals received from conference participants who are not members of the group and substantially does not include audio signals received from any of the members of the group; and (3) audio signals are mixed for distribution to conference participants who are not members of the group such that an audio signal is formed which includes (i) audio signals received from members of the group and (ii) audio signals received from non-group conference participants, if any, other than the recipient of the audio signal.

The method continues with step (d) of transmitting audio signals in accordance with steps (c)(2) and (c)(3) to the conference participants.

In the above method, the step of determining the location of the participants can be performed during the conference as well as at the beginning of the conference, and new adaptive mixing performed in case one of the participants has moved out of the same location, or two participants previously in different locations have moved to the same location. For example, in the above method, the method further comprises the steps of repeating steps (a)-(d) during the conference, wherein in the event that a conference participant previously in a group is no longer in the same geographic location, the group formed in step (c)(1) is modified to exclude the conference participant that is no longer in the same geographic location.

In still another aspect, an audio conferencing system is disclosed which provides mixed audio signals to remotely-located audio conference participants. The audio conferencing system includes a processing unit executing instructions which identifies a group of conference participants who are located at the same geographic area, e.g., after receiving location information from some or all of the participants. The system further includes a mixer mixing audio signals for distribution to the conference participants. The mixer operates such that an audio signal is distributed to the group of conference participants which includes audio signals from conference participant(s) which are not members of the group and which substantially does not include audio signals received from the members of the group.

In one embodiment, the audio conferencing system processing unit executes instructions which periodically obtains location information for the conference participants and adaptively adjusts the audio signals for distribution to the conference participants in the event that one of the members of the group has moved to a different location and therefore is no longer in the group.

In another embodiment, the processing unit executes instructions which prompt the members of the group to confirm that such participants can hear speech from the other conference participants at the same geographic location. In a variation, the processing unit processes an override message from a member of a group such that the member of the group sending the override message is deleted from the group. The participant sending the override signal is thereafter treated as if they are not co-located with any other participant.

In addition to the exemplary aspects and embodiments described above, further aspects and embodiments will become apparent by reference to the drawings and by study of the following detailed descriptions.

DETAILED DESCRIPTION OF PREFERRED EMBODIMENTS

Figure 1:
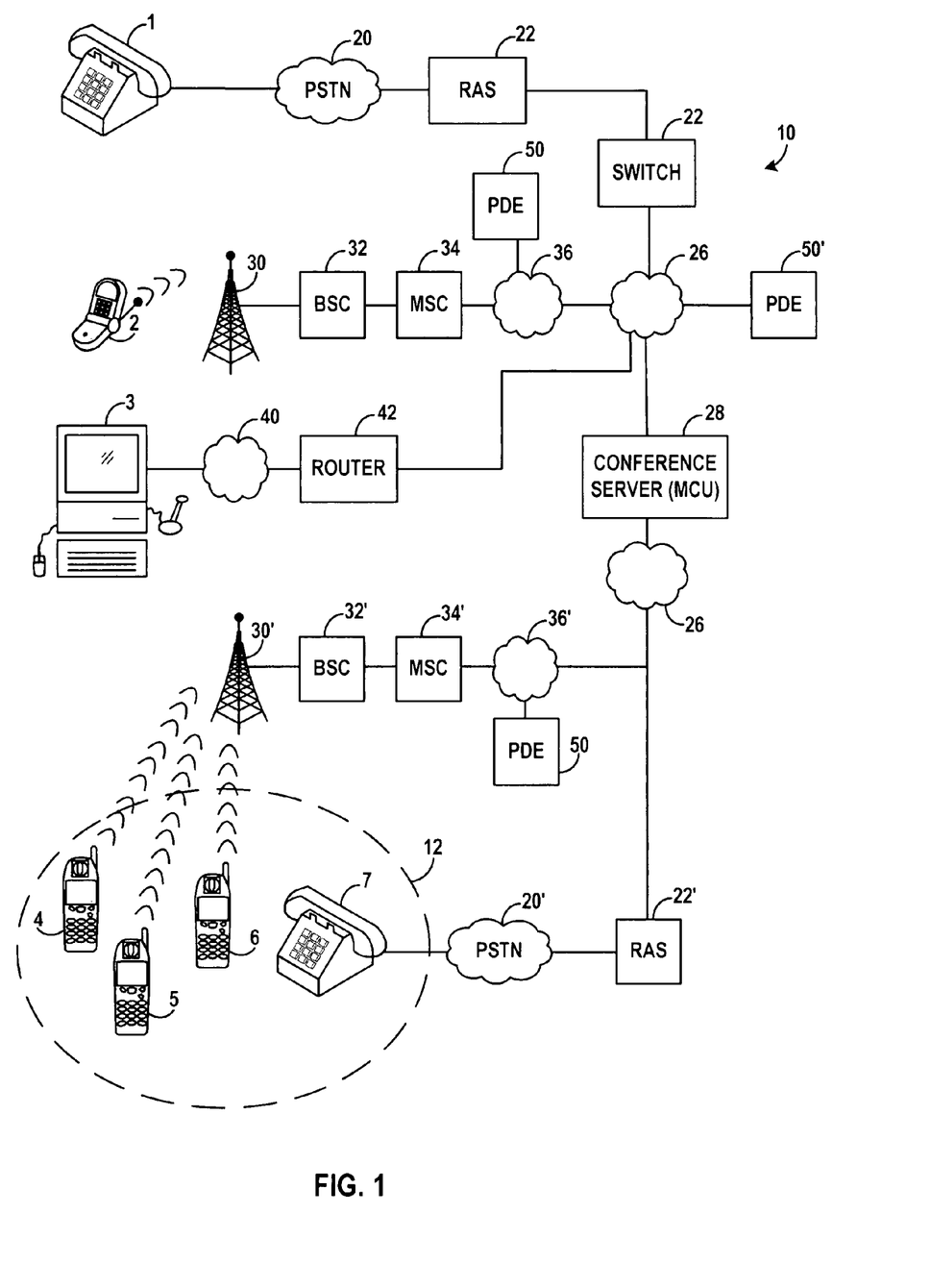
FIG. 1 is an illustration of multiple audio conference participants, some of which are located at the same geographic location, and showing a conference server (MCU) which mixes audio signals received from the participants in accordance with the methods of this disclosure.

Referring now to FIG. 1, the invention will now be described by way of an example of a group of conference participants 1-7 and a conference server 28. Consider a situation where there are seven conference participants, including a user of a conventional telephone 1, a cellular phone 2, a computer 3 having commercially available telephone software (using for example Voice over IP technology), and four conference participants who happen to be at the same geographic location 12, namely users of cellular phones 4, 5, and 6 and a user of a land-line phone 7. Assume here that phone 7 does not have speaker phone capability or for some reason the participants 4, 5, 6, 7 cannot share a single phone and thus are all talking and listening on a different phone.

The seven participants 1-7 are in communication with a network-based conference server platform 28 which includes a mixing unit MCU, such as described in the previously-cited patent documents. The conference server 28 is augmented with software logic to provide for adaptive location-based mixing of audio signals in accordance with the features of this disclosure. The invention is suitable for implementation in currently available conference servers and mixing units thereof.

The manner in which the participants are connected to the conference server 28 is not particularly important and is known in the art. In the example of FIG. 1, participant 1 communicates via the public switched telephone network (PSTN) 20, which is coupled via a remote access server (RAS) 22 to a switch or router 22 in a packet switched network which routes communications over a network 26 to the conference server 28. Participant 2 communicates via a cellular base transceiver station 30, base station controller 32, and mobile switching center to a wireless service provider network 36 which is coupled directly or indirectly with network 26. The computer 3 includes a microphone for capturing speech from the user and executes a telephone application such as MEGAPHONE™. The computer is connected via an IP network 40 and router 42 to the network 26. The phones 4, 5, and 6 are all in communication with a second base transceiver station 30', base station controller 32', MSC 34' and wireless service provider network 36' and conference server 28 via network 26. The phone 7 communicates via PSTN 20' and remote access server 22' with network 26 and conference server 28. The network 26 can be for example an Internet Protocol-based packet switched network such as the Internet.

Suppose in this example that the user of phone 1 set up the conference at the conference server 28 (such as by having an account with a business that sells conference services using the conference server 28). Conference participants 1, 2 and 3 are all at different locations. Participants 4, 5, 6 and 7 are located in the same location 12 at the time the conference is initiated. A conference number is assigned to the conference and the participants 1-7 are notified of the time of the conference and the password to join the conference. Such participants could be notified for example by email, text message, a phone call, or any other means.

When the conference is set up and the participants join the conference, the conference server platform 28 and in particular its MCU (mixing unit) mixes the audio from the participants to take advantage of location information of some or all of the participants. Location information of wireless participants 2, 4, 5, and 6 can be obtained by the conference server 28 querying a position determination entity (PDE) 50 connected to the networks 36 and 36'. The PDE is a known computer platform and database which is maintained by a wireless service provider that stores current location information for active or idle mobile telephones that are subscribers to the service provider. For example, if the phone 2 is a Verizon phone and phones 4, 5 and 6 are Sprint phones, the conference server 26 sends a position request message to the PDE 50 for the Verizon network. The position request message identifies the mobile directory number (phone number) for phone 2 and other information such as a time stamp, IP address of the conference server 28 and perhaps the purpose of the request. The PDE for the Verizon network returns a latitude and longitude coordinate for the phone 2. Similar messages are exchanged with the Sprint network and the Sprint PDE provides the conference server 28 with the geographic location (latitude and longitude) for the phones 4, 5 and 6.

The conference server may not be able to obtain location information from some of the participants, for example no location information may be available for the phones 1, 3 and 7 in the Examiner of FIG. 1. It is also possible that an additional PDE 50' be provided in the network 26 which includes location information for land-line phones, or as a clearing house for storing mobile phone location information for a variety of wireless service providers. (Privacy and the right to obtain location information for a wireless phone may be an issue and the disclosure assumes that the PDE's will provide location information for a wireless subscriber to a conference server on request. In the event that the conference server is operated by a business entity that is independent of a wireless service provider, some controls may need to be in place to limit any further dissemination of the location information to protect privacy. If the conference server 28 is implemented by the service provider then such issues are less of a concern since the location information is not leaving the network of the wireless service provider.)

The MCU in the conference server 28 obtains the location information for the conference participants in the manner described (or in any other convenient manner) and then performs an adaptive mixing of the audio signals based on location. In particular, in the event that more than one of the conference participant(s) are determined to be located in the same geographic location (such as by having the same or very closely similar latitude and longitude as is the case for phones 4, 5 and 6) the MCU mixes audio signals for distribution to the conference participants such that an audio signal is distributed to the conference participants located in the same geographic location (phones 4, 5 and 6 in the example of FIG. 1) such that it substantially does not include audio received from any of the conference participants at the same geographic location (participants 4, 5 and 6). In other words, while the server 28 may receive audio signals from the users speaking into the phones 4, 5, and 6, the audio is mixed such that the audio sent to phones 4, 5 and 6 does not include any of the audio signals received from such phones. Such phones would only receive a mixed audio signal containing the signals from the non-co-located participants, i.e., phones 1, 2, 3 and 7. This eliminates the echo and delay problem described earlier for the participants 4, 5 and 6. Audio from participant 7 would be received by the participants 4, 5 and 6 under the assumption that the location of phone 7 is not known (it being a land-line phone) and so the conference mixer MCU assumes that phone 7 is not in the same location as phones 4, 5 and 6. If the conference mixer also knows that phone 7 is at the same location as phones 4, 5 and 6 and that they can all hear each other in person (or participant 7 so advises the conference mixer), then the conference could be mixed such that participants 4, 5, 6 and 7 receive audio from conference participants 1, 2 and 3 only. The participants 1, 2 and 3 receive audio from all the other conference participants.

Figure 2:
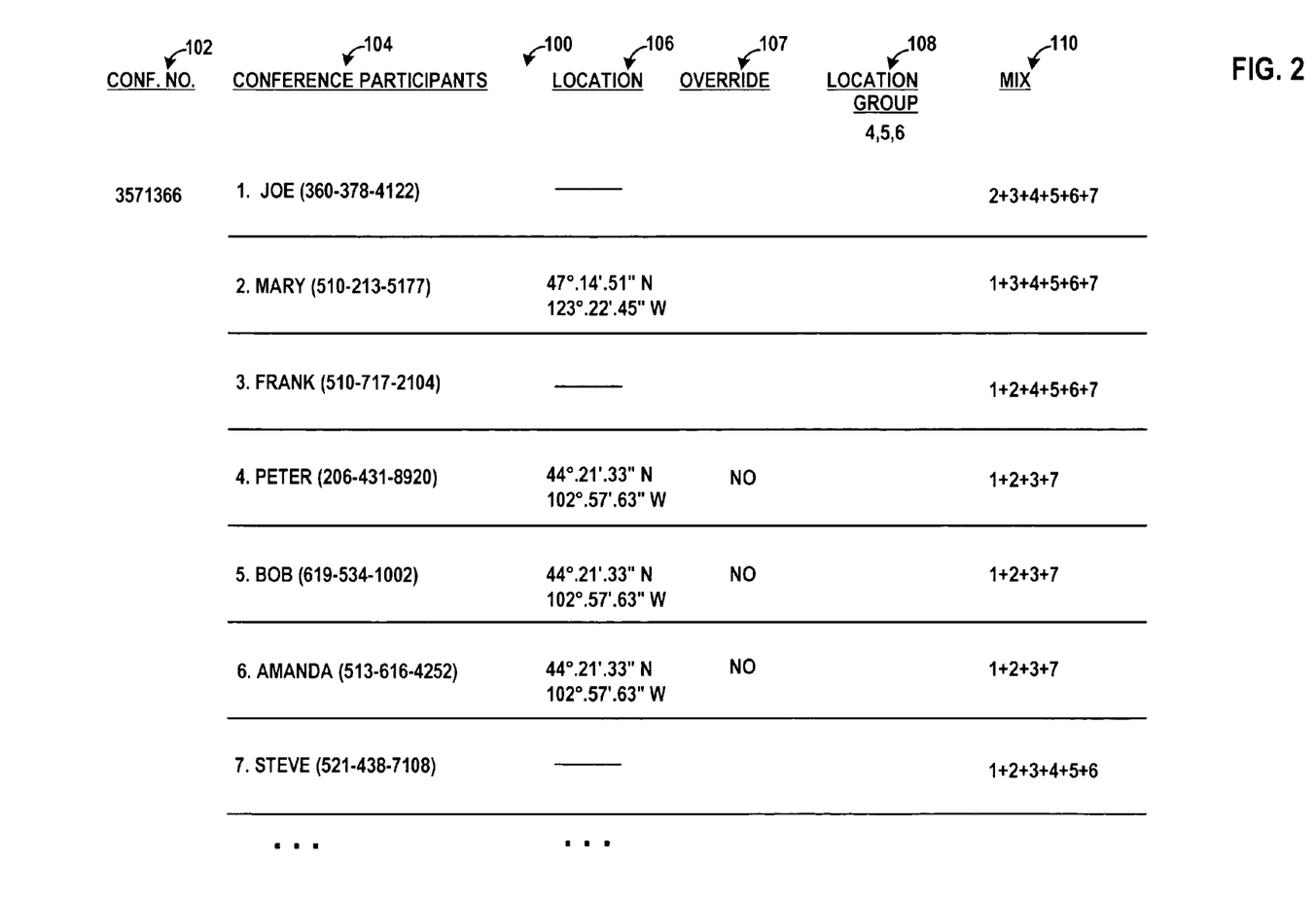
FIG. 2 is an illustration of a table stored in memory which is used by the conference server of FIG. 1 to determine how to mix the audio signals in accordance with one possible implementation of this disclosure. A group of participants located at the same location is identified.

FIG. 2 is an illustration of a table 100 stored in a computer memory or database accessible to the conference mixer (conference server 28) of FIG. 1 and used to determine the mix of audio signals in accordance with one possible implementation of this disclosure. The format of the table 100 is offered by way of example only and not limitation.

The table 100 includes a column 102 identifying the conference number for the conference, and a column 104 identifying the conference participants (participants 1-7, each associated with a name and a phone number). Column 106 identifies the geographic location, if known, for each of the participants. Note that column 106 indicates that participants 4, 5, and 6 all have the same latitude and longitude. Column 107 indicates whether an override signal has been received from any participants. The override signal is sent by a conference participant who is located at the location of another participant when they wish to receive audio from co-located participants. Column 108 identifies any location groups that happen to exist for the conference. A "location group" is a group of participants that is identified by virtue of the participants having the same location (from column 106). For example, since participants 4, 5 and 6 have the same location, a location group is identified having as members participants 4, 5 and 6.

Column 110 is a column which indicates how the audio should be mixed based on the location information that is available in order to perform the adaptive location-based mixing. The mixing of audio to be transmitted to participant 1 is such that that participant receives audio signals received from all the other members of the conference, as indicated in the first entry in column 110. Similarly, participants 2 and 3 are not located in the same location as any other member, and thus receive audio from all the other participants. Participants 4, 5 and 6 are at the same location and are in the location group identified in column 108. Accordingly, the conference mixer mixes the received audio such that participants 4, 5 and 6 receive audio from non-group members only. Accordingly, participants 4, 5 and 6 receive audio from participants 1, 2, 3 and 7 as shown in the column 110. The location of participant 7 is not known, so the mix for this participant is such that it receives audio from participants 1-6.

Figure 2A:
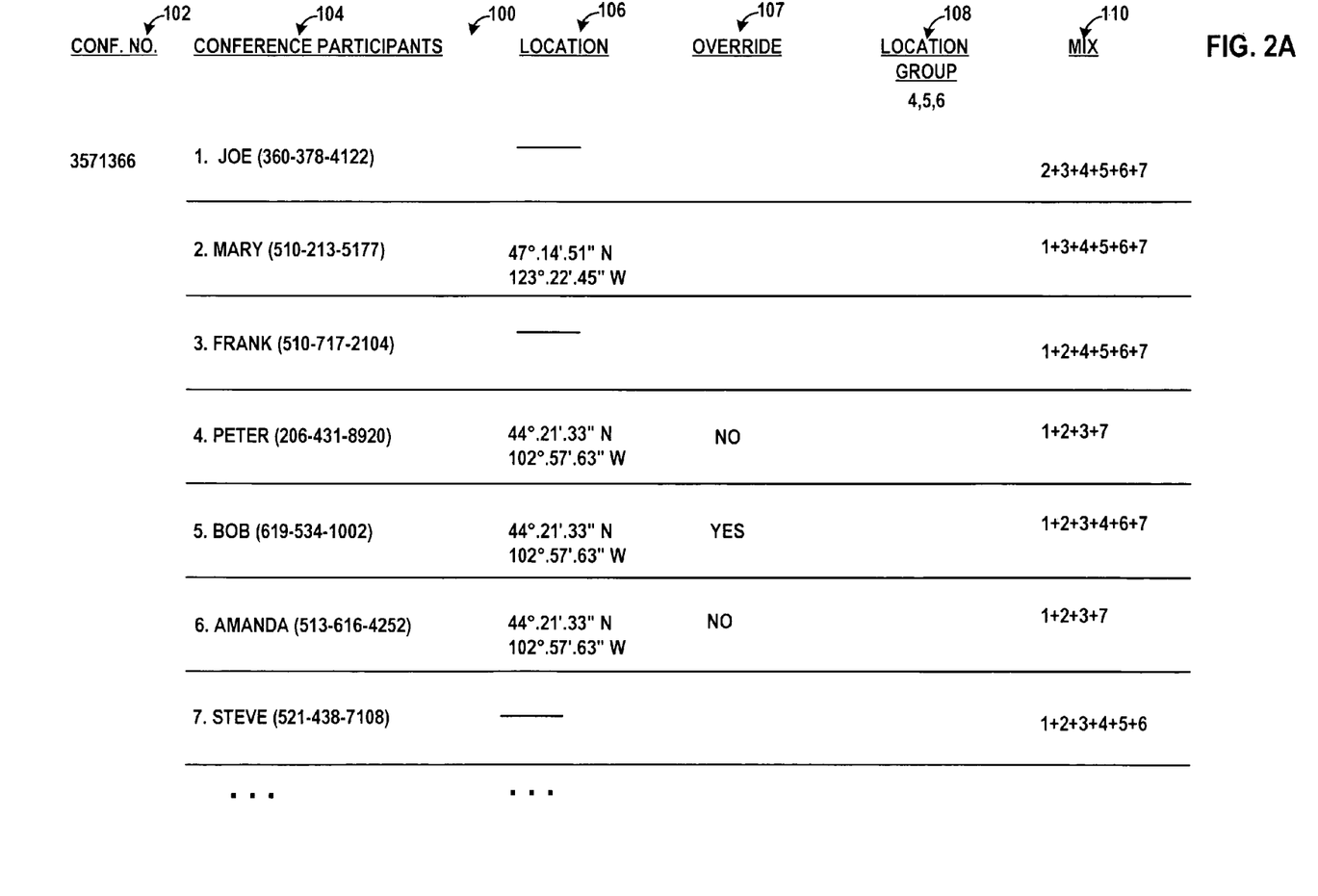
FIG. 2A is an illustration of the table of FIG. 2A after one of the participants has issued an override message to the conference server. The conference server adapts to this event and changes the mix for that participant.

Suppose that participant 5 wanted to override the mix such that he received audio from all other participants. Participant 5 would send an override signal to the conference server such as by pressing # 8. The override signal is reflected in the revised table of FIG. 2A, which shows in column 107 that an override was received from participant 5. The location group 108 that was identified is not revised, since this location group is still used to mix audio for participants 4 and 6. The YES override flag in column 107 is used by the mixing algorithm for purposes of mixing audio for participant 5. In particular, participant 5 is treated as though he is not in the location group and as such receives audio from all the other conference members as indicated in the column 110 for the entry for participant 5. Note that the participant 5 sending the override signal receives audio signals from the other participants 4 and 6 that are located at the same geographic location. The mixing for participants 4 and 6 is the same, since they are still co-located with participant 5 and have not issued an override signal.

Figure 3:
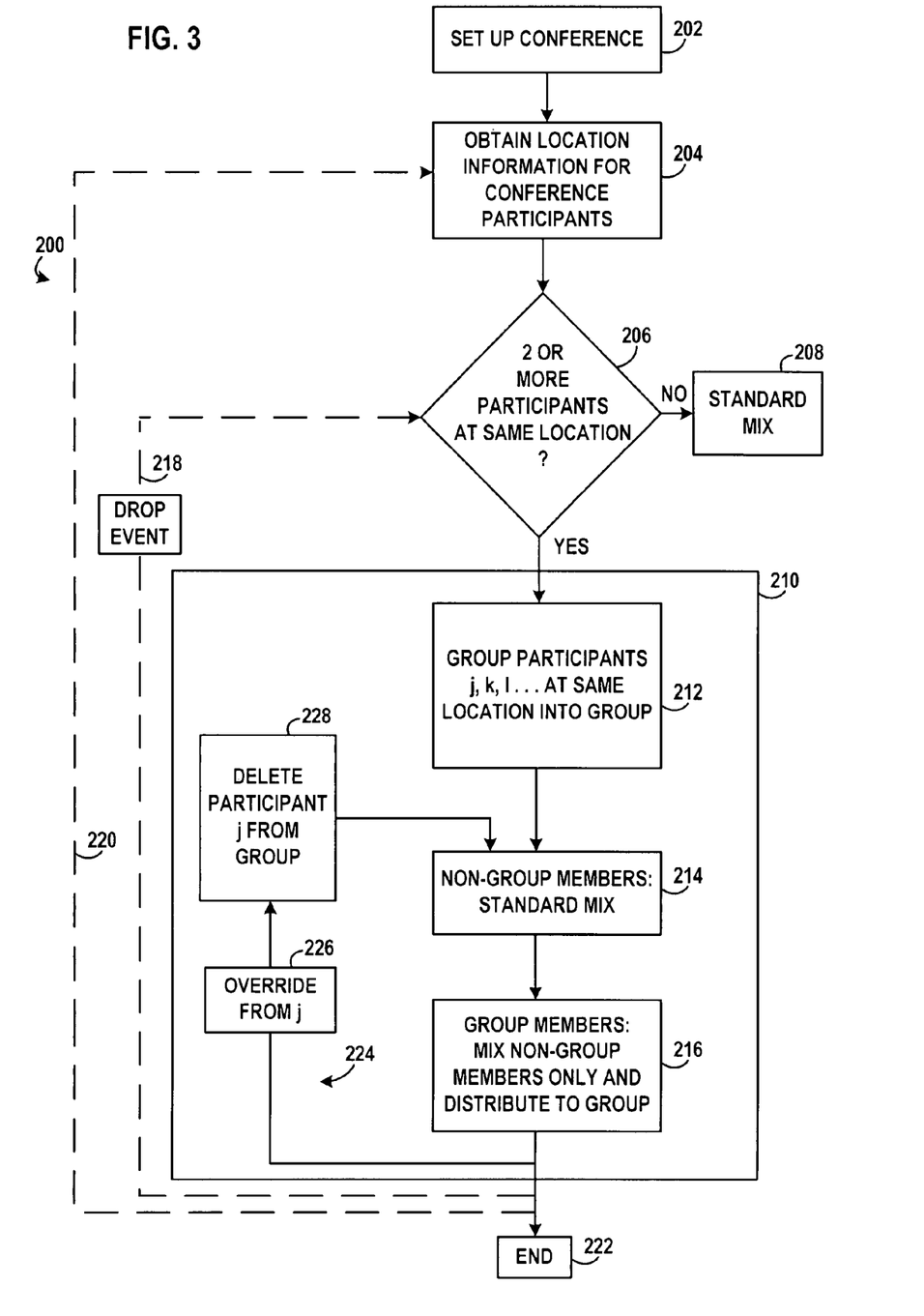
FIG. 3 is a flow chart showing a sequence of steps coded in software which may be used by a processing unit in the conference server to mix the audio signals from the participants based on location.

FIG. 3 is a flow chart showing a sequence of steps 200 coded in software which may be used by a processing unit in the conference server mixing unit 28 of FIG. 1 to mix the audio signals from the participants based on location.

At step 202, the conference is set up in known fashion and the participants join the conference by dialing into the conference server 28 and entering a conference number and pass code, speaking their name, and indicating whether they are the leader of the conference.

At step 204, the conference server 28 obtains location information for conference participants. Such location information is obtained from the PDE platforms 50 of FIG. 1. Such location information will be typically obtained for all conference participants using wireless telephones. The location information for participants is stored in memory of the conference server, for example in the form of a table as shown in FIG. 2 in column 106.

At step 206, the conference server 206 determines whether two or more of the participants are at the same location, e.g., with reference to column 106 of FIG. 2. If no two conference participants are known to be at the same location, the processing proceeds to step 208 and a "standard mix" is performed. In the "standard mix", the mixing unit in the conference server mixes the received audio signals such that each participant in the conference receives audio containing audio from all the other members of the group, but not the audio received from the recipient. (See for example column 110 of FIG. 1 and the entries for participants 1 and 2).

If at processing step 206 two or more participants are determined to be at the same location, the processing proceeds to an adaptive location mixing process shown as block 210 in FIG. 3. This processing includes sub-step 212, 214 and 216 and the override steps 224, 226 and 228. In sub-step 212, a grouping is performed to identify those conference participants i, j k, etc. that are located in the same location (based on location information received at step 204.) At step 214, a mixing is done for conference participants who are not located in the group. In this step, the "standard mix" approach is used, i.e., each non-group member receives a mixed audio signal which includes audio received from all of the other participants. Examples were shown in FIG. 2, and the mix column 110 for participants 1, 2, 3, and 7.

At step 216, the adaptive location mixing is performed for the group members—basically, the group members receive a mixed audio signal that only contains the audio received from non-group members. The mixed audio signal that the group members receive does not include audio from any other group member. (See FIG. 2, mix column 110 for members 4, 5 and 6). This mixing prevents the group members from hearing the other co-located members both directly (in person) and through their telephones, eliminating the delay and echo problems described earlier.

In the event that one of the group members (member j) issues an override signal, the processing proceeds to branch 224 of FIG. 3. The override is received as indicated at 226, and at step 228 the participant j is deleted from the group. The mixing of group and non-group members as indicated at steps 214 and 216 is re-performed as indicated in FIG. 3, with the group reconfigured to delete participant j from the group. An example of this was shown in FIG. 2A.

Suppose that one of the conference participants drops from the conference after it has started. This is shown in loop 218. The processing proceeds back to step 206 and the conference server 28 determines whether two or more of the remaining participants are located at the same location. The rest of the mixing process 200 proceeds as shown in FIG. 3.

As shown by the loop 220, the obtaining of location information at step 204 continues during the course of the conference. For example, loop 220 could be initiated every 60 seconds during the conference, or at any other period determined by the conference server. This feature allows the conference server to obtain updated location information at step 204 and then adaptively mix the audio signals to take into account participants moving out of a common location or moving into a common location. For example, if one of the participants of FIG. 1, e.g., participant 6, happens to move out of the location 12, such new location will be detected by the PDE 50 for network 36', and when step 204 is executed the table of FIG. 2 will be changes to show participant 6 at a location which is not the same as the location of participants 4 and 5. Thus, the location group will be revised to only include participants 4 and 5 and participant 6 will be treated as any other participant who is not co-located with another participant. The mixing of audio signals in module 210 will accordingly change in the next iteration of this module.

Additionally, in the event that another participant joins the conference after it started, who also happened to be at location 12, then this new participant will be grouped with members 4 and 5 and the mixing process in module 210 of FIG. 3 adapted to reflect this new grouping of co-located participants in steps 206 and 210.

As another example of the processing in loop 220, in the next iteration at step 204 the participant location is updated. If at step 206 it is determined that a participant moved to the same location as another participant, a new group will be identified at step 212 and conference mixing will be adapted per steps 214 and 216. For example if participant 4 of FIG. 1 moved to the same location of participant 2 during the conference, this will be detected at step 206 in a subsequent iteration of the process (due to loop 220) and at step 212 participants 4 and 2 will be grouped together. Non-group members will receive the standard mix at step 214, that is, they receive audio from all other participants. At step 216, members 2 and 4 will receive audio from all other participants except each other. The group consisting of participants 5 and 6 also exists since they remain at the same location 12. In this situation, two groups of co-located participants are identified in the conference mixer. These group members 5 and 6 will receive audio signals from all other participants except each other.

Figure 4:
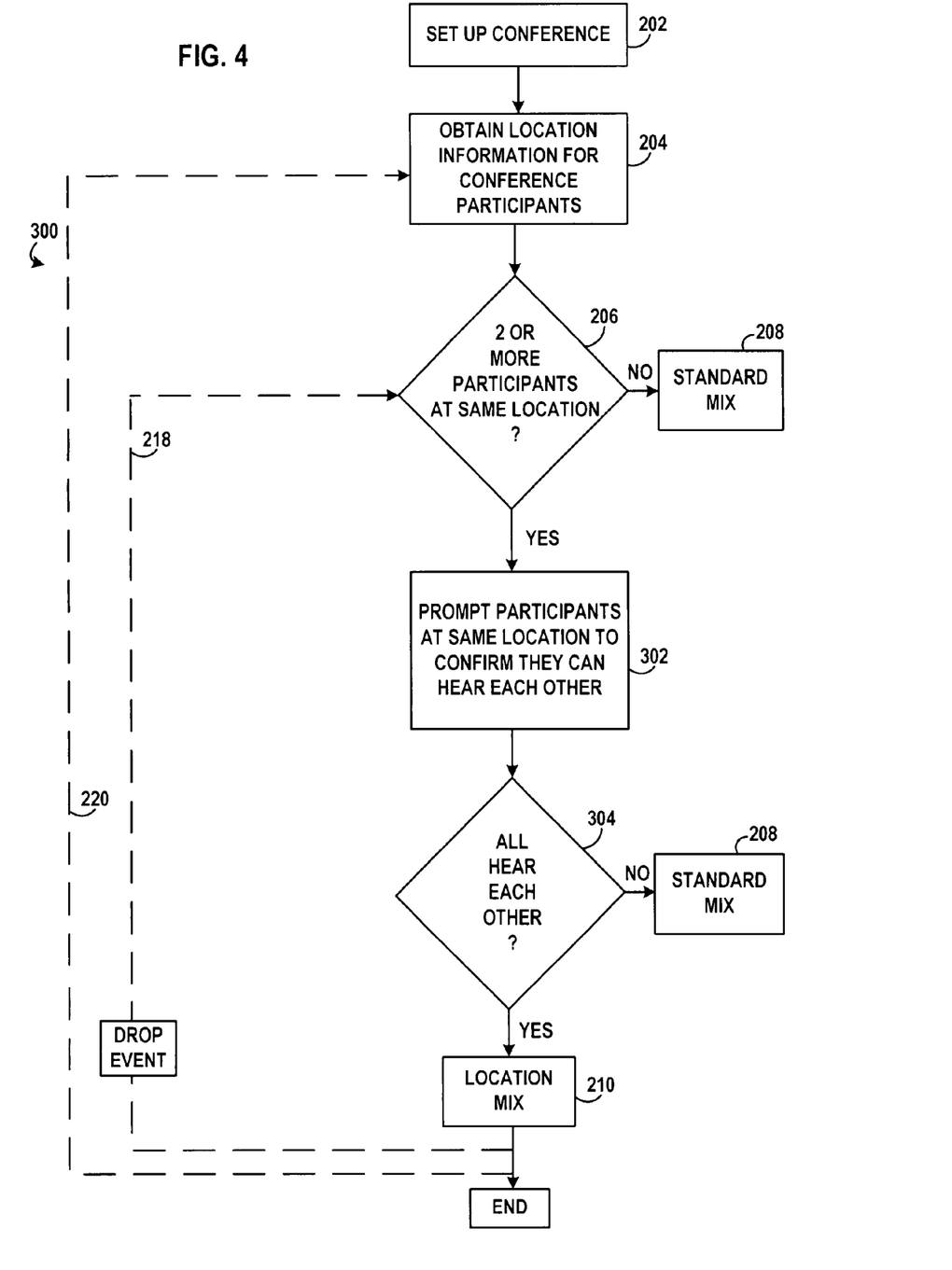
FIG. 4 is a flow chart showing a variation to the processing of FIG. 3 in the situation where a voice prompt is provided to the participants at the same location to confirm that they can hear other participants at the same location.

FIG. 4 is a flow chart showing a variation 300 to the processing of FIG. 3 in the situation where a voice prompt is provided to the participants determined at the same location to confirm that they can hear other participants at the same location. Steps 202, 204 are the same as for FIG. 3. At step 206, if two or more participants are determined to be at the same location, the conference server issues a prompt message at 302 which asks the participants at the same location to confirm that they can hear each other directly. If they cannot hear each other, then the standard mix is used 208 for all participants. If they can, then the location mix 210 (including sub-steps) as shown in FIG. 3 is performed. The idea behind FIG. 4 is that if two or more participants are at the same location but cannot hear each other directly, then the mixing process should be conducted such that these participants should receive audio which includes audio received from other co-located participants. The problems with echo and delay will not occur in this situation because the participants cannot hear the other co-located participants directly and thus need to hear them through the telephone.

From the above it will be appreciated that a method of mixing audio from multiple remotely located conference participants has been described comprising the steps of: obtaining geographic location information for at least some of the conference participants (step 204, exchange of message with PDE 50 of FIG. 1); and in the event that more than one of the conference participant(s) are located in the same geographic location, mixing audio signals for distribution to the conference participants such that an audio signal is distributed to the conference participants located in the same geographic location substantially does not include an audio signal received from any of the conference participants at the same geographic location, see FIG. 3 block 216 and FIG. 2, mix for group members 4, 5 and 6. As shown in FIG. 4, the method can also include a step of prompting conference participants located in the same geographic location to confirm that such participants can hear speech from the other conference participants at the same geographic location (step 302 in FIG. 4).

The method may also include a step of determining whether any of the conference participants are using wireless telephones (e.g., by determining whether the phone numbers of the participants are assigned to wireless service providers using a look-up table or by obtaining this information directly from the participants when they join a call). The step of obtaining location information for participants can be performing for those conference participants using wireless telephones.

It will also be appreciated that a method has been described for providing conference services for multiple remotely located conference participants, comprising the steps of:

(a) obtaining geographic location information of at least some of the conference participants (step 204);

(b) determining whether more than one conference participants are located at substantially the same geographic location (step 206);

(c) in the event that more than one conference participant(s) are located in the same geographic location, mixing audio signals from the conference participants in accordance with the following steps:

(1) identifying a group of conference participants which are located at the same geographic location (step 212);

(2) mixing audio signals from the conference participants to form an composite audio signal for distribution to the members of the group such that the composite audio signal contains audio signals received from conference participants who are not members of the group and substantially does not include audio signals received from any of the members of the group (mixing step 216); and (3) mixing audio signals for distribution to conference participants who are not members of the group such that an audio signal is formed which includes (1) audio signals received from members of the group and (2) audio signals received from non-group conference participants, if any, other than the recipient of the audio signal (the standard mix, mixing step 214 of FIG. 3); and (d) transmitting audio signals in accordance with (c)(2) and (c)(3) to the conference participants.

As shown by the loop 220 in FIGS. 3 and 4, the method can further comprise the steps of repeating steps (a)-(d) during the conference, wherein in the event that a conference participant previously in a group is no longer in the same geographic location, the group formed in step (c)(1) is modified to exclude the conference participant that is no longer in the same geographic location.

It will further be appreciated that a new and improved an audio conferencing system 28 for providing mixed audio signals to remotely-located audio conference participants has been described. The conference system takes the form of a conference server, MCU or other similar entity which includes a processing unit executing instructions which identifies a group of conference participants who are located at the same geographic area. The conference system further includes a mixer mixing audio signals for distribution to the conference participants such that an audio signal is distributed to the group of conference participants (mixing step 216) which includes audio signals from conference participant(s) which are not members of the group and which substantially does not include audio signals received from the members of the group. Examples of this were given in FIGS. 2 and 2A previously, see mixing column 110. As explained above in conjunction with the loop step 220 of FIGS. 3 and 4, the processing unit executes instructions which periodically obtains location information for the conference participants and adaptively adjusts the audio signals for distribution to the conference participants in the event that one of the members of the group has moved to a different location and therefore is no longer in the group.

As shown in the embodiment of FIG. 4 and prompt step 302, the processing unit executes instructions which prompt the members of the group to confirm that such participants can hear speech from the other conference participants at the same geographic location.

As shown by the override loop processing 224 of FIG. 3, the processing unit executes instructions which process an override message 226 from a member of a group such that the member of the group sending the override message is deleted from the group, as indicated at step 228.

While a number of exemplary aspects and embodiments have been discussed above, those of skill in the art will recognize that various modifications, permutations, additions and sub-combinations thereof are also present within this disclosure and can be made without departure from the scope of the invention. It is therefore intended that the following appended claims and claims hereafter introduced are interpreted to include all such modifications, permutations, additions and sub-combinations as are within their true spirit and scope.

I claim:

1. A method of mixing audio from multiple remotely located conference participants, comprising the steps of:
    obtaining geographic location information for at least some of the conference participants;
    in the event that more than one of the conference participants are located in the same geographic location, mixing audio signals for distribution to the conference participants such that an audio signal that is distributed to the conference participants located in the same geographic location substantially does not include an audio signal received from any of the conference participants at the same geographic location; and
    receiving an override signal from a participant located at the same geographic location and adjusting the mixing such that the participant sending the override signal receives audio signals from the other participants at the same geographic location.

2. The method of claim 1, wherein the method further comprises the step of prompting conference participants located in the same geographic location to confirm that such participants can hear speech from the other conference participants at the same geographic location.

3. The method of claim 1, wherein the method further comprises the step of determining whether any of the conference participants are using wireless telephones and performing the obtaining step for those conference participants using wireless telephones.

4. The method of claim 1, further comprising the step of, during the conference, identifying a new group of conference participants having the same geographic location due to movement of one or more of the conference participants during the conference and adapting the mix of audio signals such that the new group of participants at the same location receive audio signals from other conference participants but not from each other.

5. The method of claim 1, further comprising the step of, during the conference, identifying conference participants having moved from the same geographic location as a second conference participant and thereafter adapting the mix of audio signals such that the conference participants that have moved receive audio signals from other conference participants including the second participant.

6. A method for providing conference services for multiple remotely located conference participants, comprising the steps of:
    (a) obtaining geographic location information of at least some of the conference participants;
    (b) determining whether more than one conference participants are located at substantially the same geographic location;
    (c) in the event that more than one conference participants are located in the same geographic location, mixing audio signals from the conference participants in accordance with the following steps:
        (1) forming a group of conference participants which are located at the same geographic location;
        (2) mixing audio signals from the conference participants to form a composite audio signal for distribution to the members of the group such that the composite audio signal contains audio signals received from conference participants who are not members of the group and substantially does not include audio signals received from any of the members of the group; and
        (3) mixing audio signals for distribution to conference participants who are not members of the group such that an audio signal is formed which includes (1) audio signals received from members of the group and (2) audio signals received from conference participants who are not members of the group, if any, other than the recipient of the audio signal;
    (d) transmitting audio signals in accordance with (c)(2) and (c)(3) to the conference participants; and
    (e) receiving an override signal from a participant in the group and thereafter treating the participant as not a member of the group.

7. The method of claim 6, wherein the method further comprises the steps of repeating steps (a)-(d) during the conference, wherein in the event that a conference participant previously in a group is no longer in the same geographic location, the group formed in step (c)(1) is modified to exclude the conference participant that is no longer in the same geographic location.

8. The method of claim 6, wherein the method further comprises the steps of repeating steps (a)-(d) during the conference, wherein in the event that a conference participant moves to the same geographic location as another conference participant a group is formed in step (c)(1) for such newly co-located participants.

9. The method of claim 6, wherein in the event that step (b) results in a determination that two or more participants are at the same geographic location, the method further comprises the step of prompting the conference participants determined to be located in the same geographic location to confirm that such participants can hear speech from the other conference participants at the same geographic location.

10. The method of claim 6, wherein the method further comprises the step of determining whether any of the conference participants are using wireless telephones and wherein step (b) is performed for those conference participants using wireless telephones.

11. An audio conferencing system for providing mixed audio signals to remotely-located audio conference participants, comprising:

a processing unit configured to execute instructions to identify a group of conference participants who are located at the same geographic area; and a mixer configured to mix audio signals for distribution to the conference participants such that an audio signal is distributed to the group that includes audio signals from conference participants that are not members of the group and which substantially does not include audio signals received from the members of the group, wherein the processing unit is further configured to execute instructions to process an override message from a member of the group such that the member of the group sending the override message is thereafter treated as being not a member of the group.

12. The audio conferencing system of claim 11, wherein the processing unit is further configured to execute instructions to periodically obtain location information for the conference participants and adaptively adjust the audio signals for distribution to the conference participants in the event that one of the members of the group has moved to a different location and therefore is no longer in the group.

13. The audio conferencing system of claim 11, wherein the processing unit is further configured to execute instructions to prompt the members of the group to confirm that such participants can hear speech from the other conference participants at the same geographic location.

14. The audio conferencing system of claim 11, wherein the processing unit is further configured to exchange messages with a position determining entity of a wireless service provider network to determine the members of the group.

15. The audio conferencing system of claim 11, wherein the processing unit is further configured to execute instructions to identify a new group of co-located conference participants during the conference and adaptively change the mix of audio signals to be transmitted to the new group of conference participants.

16. The audio conferencing system of claim 11, wherein the processing unit is further configured to execute instructions to identify a change in membership of a previously identified group of co-located conference participants during the conference, the change due to movement of a conference participant away from the location of another participant(s), and to adaptively change the mix of audio signals to be transmitted to the conference participants including the participant moving away from the location of the other participant(s).

* * * * *